United States Patent
Chang et al.

(10) Patent No.: US 7,607,144 B2
(45) Date of Patent: Oct. 20, 2009

(54) METHOD FOR DETECTING SIZE OF THE OPTICAL DISK AND EJECTING OPTICAL DISK

(75) Inventors: Sung-San Chang, Taipei (TW); Rong-Son Jeng, Taipei (TW); Chin-Lung Huang, Taipei (TW)

(73) Assignee: Lite-On It Corporation, Taipei (TW)

( * ) Notice: Subject to any disclaimer, the term of this patent is extended or adjusted under 35 U.S.C. 154(b) by 542 days.

(21) Appl. No.: 11/359,571

(22) Filed: Feb. 23, 2006

(65) Prior Publication Data

US 2006/0225085 A1 Oct. 5, 2006

(30) Foreign Application Priority Data

Mar. 30, 2005 (TW) .............................. 94110145 A

(51) Int. Cl.
*G11B 17/04* (2006.01)
(52) U.S. Cl. ................. 720/645; 369/30.32; 369/30.36; 369/53.22
(58) Field of Classification Search ............. 369/30.32, 369/30.36, 53.2, 53.22; 725/645
See application file for complete search history.

(56) References Cited

U.S. PATENT DOCUMENTS

| | | | | |
|---|---|---|---|---|
| 5,644,561 A | * | 7/1997 | Son et al. | 369/53.2 |
| 5,970,035 A | * | 10/1999 | Ohmori et al. | 369/53.2 |
| 6,414,927 B1 | * | 7/2002 | Ota | 369/53.41 |
| 7,180,840 B1 | * | 2/2007 | Kim | 369/53.2 |

* cited by examiner

*Primary Examiner*—Hoa T Nguyen
*Assistant Examiner*—Andrew J Sasinowski
(74) *Attorney, Agent, or Firm*—Bacon & Thomas, PLLC

(57) ABSTRACT

A method for detecting a size of an optical disk loaded in an optical disk drive is disclosed. The optical disk drive has an optical pickup head, and the initial position of the optical pickup head is located on the outer side of a track. The steps of the method are described as follows. First, the optical disk is loaded. Then, the optical pickup head is moved from the initial position to a first position, and a laser beam is irradiated simultaneously. The laser beam reflected by the optical disk is received by the optical pickup head. According to the condition of the reflected laser beam received by the optical pickup head, the size of the disk can be determined.

10 Claims, 3 Drawing Sheets

METHOD FOR DETECTING SIZE OF THE OPTICAL DISK AND EJECTING OPTICAL DISK

This application claims the benefit of Taiwan application Serial No. 94110145, filed Mar. 30, 2005, the subject matter of which is incorporated herein by reference.

BACKGROUND OF THE INVENTION

1. Field of the Invention

The invention relates in general to a method for detecting a size of an optical disk and ejecting the optical disk, and more particularly to the method for detecting size of an optical disk and ejecting the optical disk quickly using the reflecting light received by the optical pickup head.

2. Description of the Related Art

In the main stream of the optical disk drive, the mechanisms for carrying the disk can be divided into a slot-in type drive and a tray type drive. The most common seen diameter lengths of the disks are 8 cm and 12 cm. Typically, the immediate ejection of the disk is performed according to the default value of the program presetting in the optical disk drive. When an 8 cm-disk is inserted into the slot-in type drive and would like to be ejected immediately, the disk drive would eject the disk according to the default value of the program built-in drive. If the default value is 8 cm, the ejection procedure will be normal. However, if the default value presetting in the drive is 12 cm, which means the ejection length is longer than 8 cm, the 8 cm-disk may fall from the drive and be damaged. If a 12 cm-disk is inserted into a slot-in type drive with the default value of 8 cm, the ejection length (i.e. 8 cm) is insufficient for 12 cm-disk, which makes the disk trap in the slot-in type drive.

Refers to FIG. 1, a flow chart of a conventional method for detecting an optical disk is shown. First, an optical disk is loaded on the drive, as shown in the step 101. Then, the traverse module is flushed in the step 103. In the step 105, the optical disk is clamped tightly. Next, an optical pickup head moves from the outer side of the track to the inner side of the track in the step 107. In the step 109, the spindle motor of the drive is driven to rotate the optical disk. Next, the data of the optical disk is read and decoded using the laser light in the step 111. Since the weights and inertia momentum of the 8 cm-disk and the 12 cm-disk are different, the 8 cm-disk and the 12 cm-disk have different angular velocities during the rotation. When the step 111 is performed, the disk can be distinguished by the slot-in type disk drive according to its own angular velocity. According to FIG. 1 and the related description above, it requires several steps to tell the size of the disks correctly, which is time-consuming. In addition, a scraped optical disk loaded on the slot-in disk drive may have an effect on the rotation; thus, the dick would be mis-decoded and wrong information of the disk is obtained.

SUMMARY OF THE INVENTION

It is therefore an object of the invention to provide a method for detecting a size of an optical disk and ejecting the optical disk quickly, whether the disk is damaged or not.

The invention achieves the above-identified object by providing a method for detecting a size of an optical disk loaded in an optical disk drive. The optical disk drive has an optical pickup head, and the initial position of the optical pickup head is located on the outer side of a track. The steps of the method are described as follows. First, the optical disk is loaded. Then, the optical pickup head is moved from the initial position to a first position, and a laser beam is irradiated simultaneously. The laser beam reflected by the optical disk is received by the optical pickup head. According to the condition of the reflected laser beam received by the optical pickup head, the size of the disk can be determined.

The invention achieves the above-identified object by further providing a method for ejecting an optical disk loaded in an optical disk drive. The optical disk drive has an optical pickup head initially located in an outer side of a track. The steps of the method are described as follows. First, the disk is loaded. Second, the optical pickup head is moved from the initial position to a first position and a laser beam is irradiated simultaneously. The laser beam reflected by the optical disk is received by the optical pickup head. According to the condition of the reflected laser beam received by the optical pickup head, the size of the optical disk can be determined. When an ejection signal is received, an ejection length is determined according to the size of the optical disk and the optical disk is ejected from the optical disk drive.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
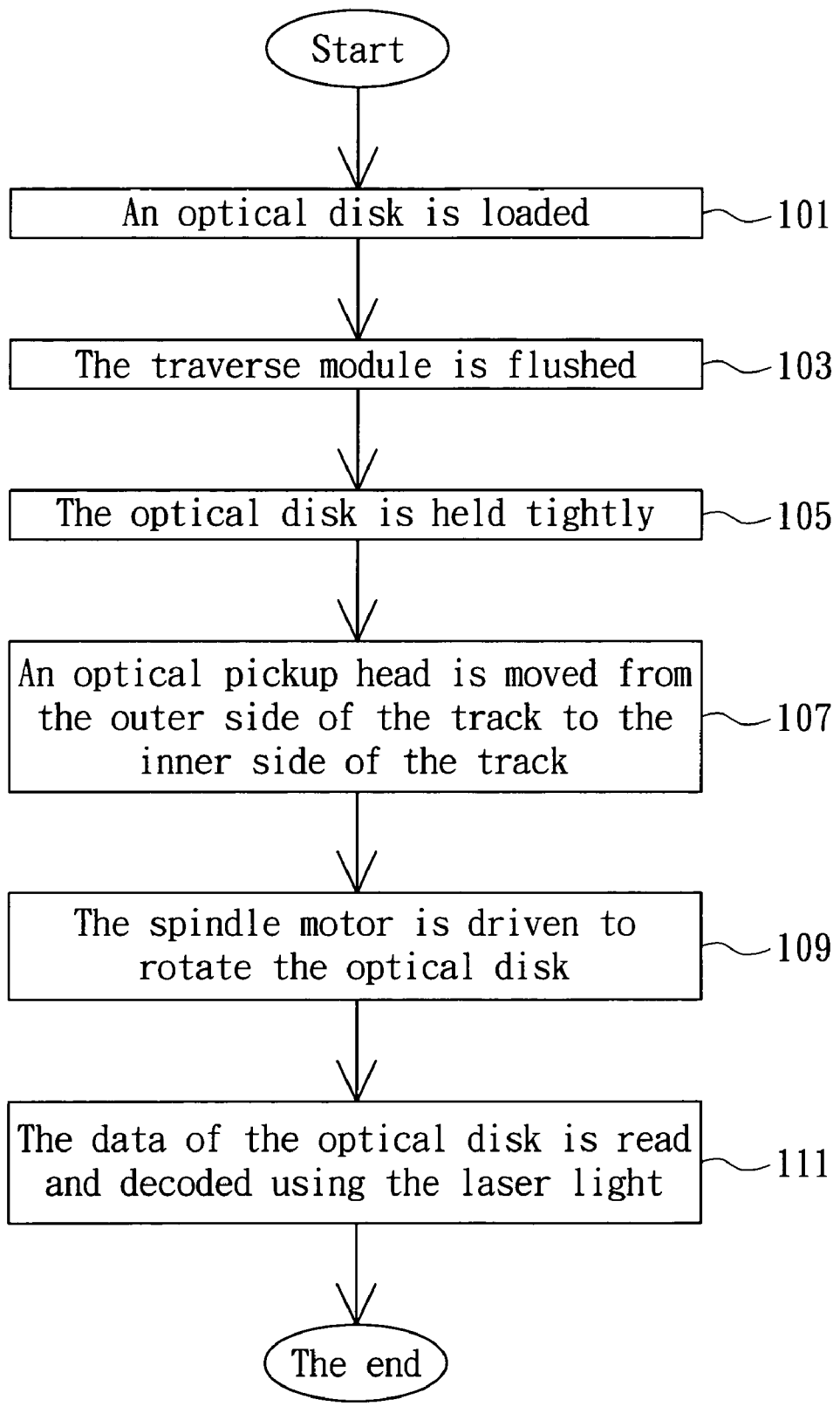
FIG. 1 is a flow chart of a conventional method for detecting an optical disk.
Figure 2A:
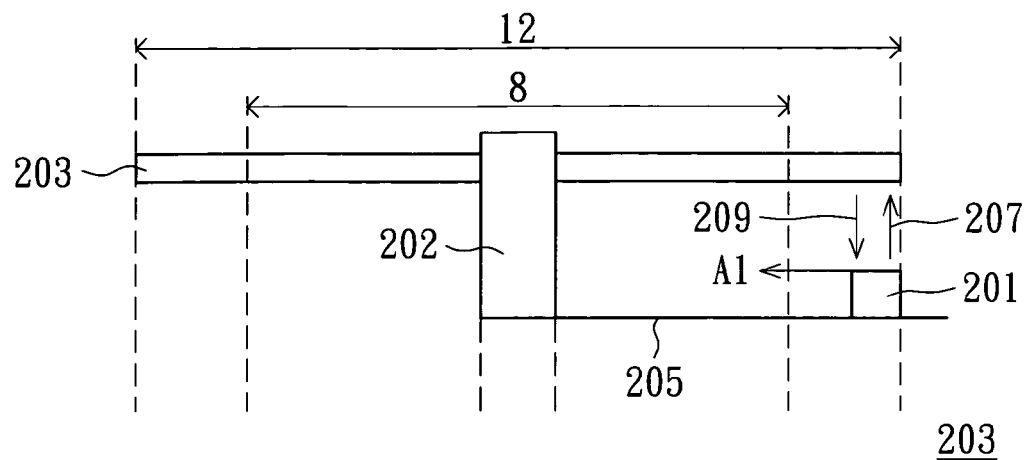
FIG. 2A is a schematic view of the optical pickup head and the optical disk.
Figure 2B:
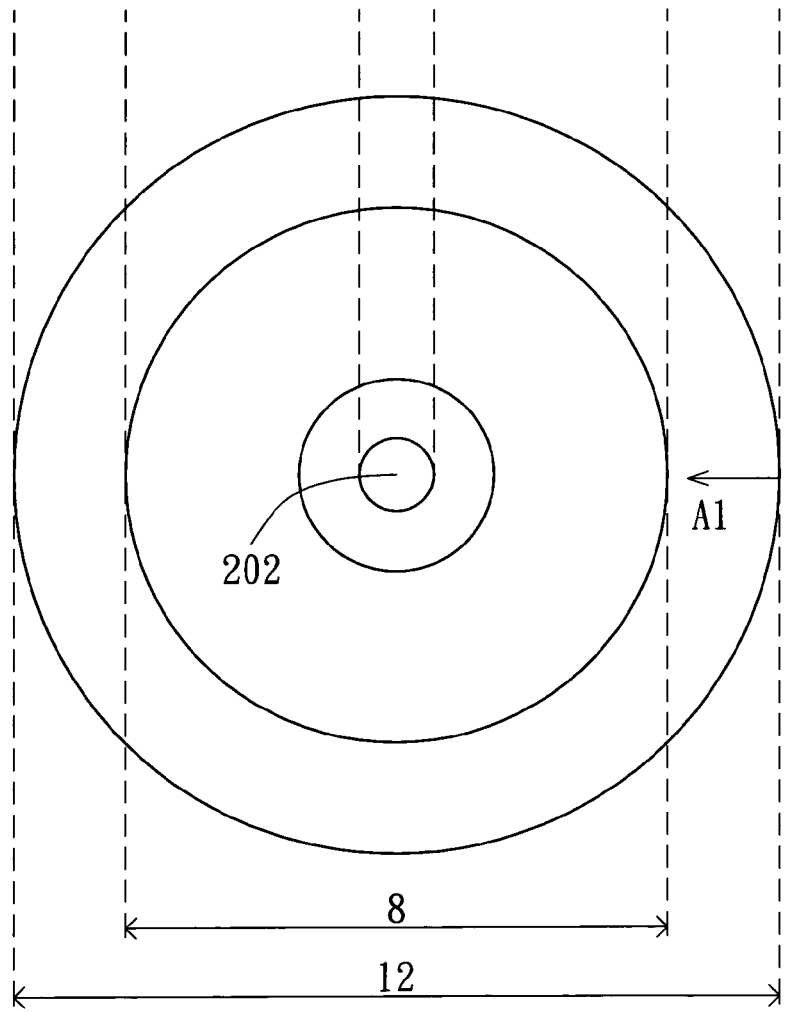
FIG. 2B is a top view of the optical disk.

Please refer to FIG. 2A and FIG. 2B. FIG. 2A is a schematic view of the optical pickup head and the optical disk. FIG. 2B is a top view of the optical disk. As shown in FIG. 2A, an optical pickup head 201 and an optical disk 203 are disposed in an optical disk drive, such as a slot-in type drive or a tray type drive. The optical pickup head 201 is movably disposed on the track 205. In FIG. 2A, the optical pickup head 201 is disposed on the outer side of the track 205.

Figure 3:
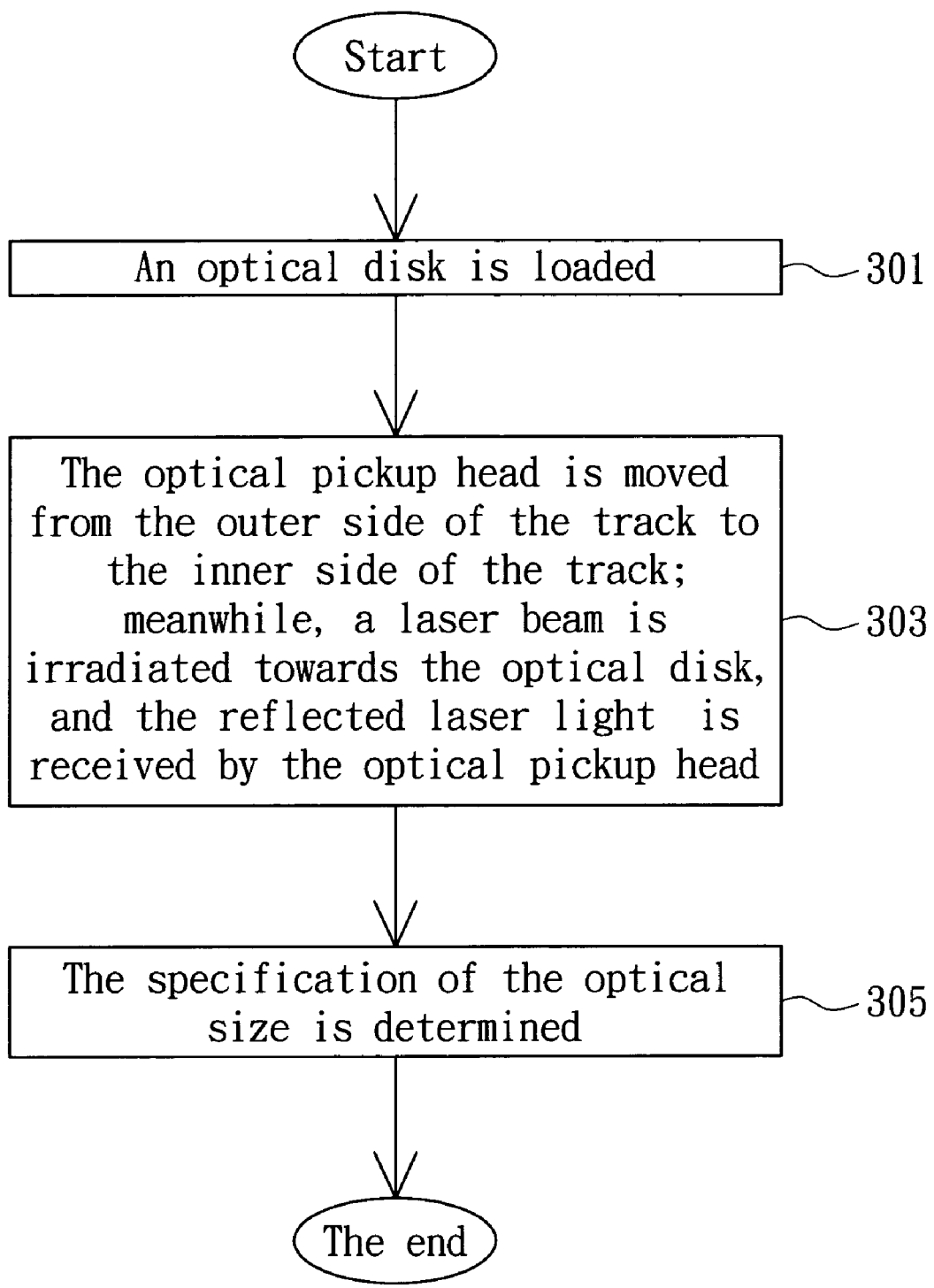
FIG. 3 is a flow chart of a method for detecting an optical disk according to the preferred embodiment of the invention.

FIG. 3 is a flow chart of a method for detecting an optical disk according to the preferred embodiment of the invention. Please also refer to FIG. 2A and FIG. 2B. First, the optical disk 203 is loaded on the traverse module 202 of the optical disk drive in the step 301. In the step 303, the optical pickup head 201 is then moved from the outer side of the track (initial position in FIG. 2A) 205 to the inner side of the track (i.e. the first position) 205; meanwhile a laser beam 207 is irradiated towards the optical disk 203, and the reflected laser light 209 is received by the optical pickup head 301. According to the light reflected to the optical pickup head 301, the specification (such as the size) of the disk 203 is revealed in the step 305. For example, when the optical pickup head 201 is moved from the outer side to the inner side of the track 205 and the laser light 207 is continuously irradiated to the disk 203, the reflected light 209 will be continuously received by the optical pickup head 201 if the disk 203 of FIG. 2A loaded in the optical disk drive has a diameter of 12 cm. In other words, if the optical pickup head 201 is initially set at a position of 12 cm away from the spin center of the disk 203, the laser beam will be continuous reflected by the 12 cm-disk and received by the optical pickup head. Thus, the optical disk drive can determine the diameter of the disk 203 according to the laser reflected condition.

If the diameter of the disk 203 is 8 cm and the optical pickup head 201 is initially set at a position of 12 cm away from the spin center of the disk 203, there is an interval before optical pickup head 201 receives the reflected light 209. When the optical pickup head 201 is moved from the outer side of the track 205 to the inner side of the track and the laser light 207 is irradiated, the laser beam 207 cannot be reflected until it reaches the body of the 8 cm-disk; thus, the laser receiving condition of the optical pickup head 200 would be blank for a while. Accordingly, the diameter of the disk can be well distinguished without moving the optical pickup head 201 all the way to the innermost side of the track 205 and then decoding the data.

After the steps 301-305 are performed, the optical disk drive 200 can easily differentiate the diameter of the disk 203 to be 8 cm or 12 cm. If a user inserts an optical disk into a drive with a conventional detecting program and would like to eject the optical disk immediately, the optical disk drive incapable of differentiating the size of the disk in time will provide a presetting force to eject the optical disk; thus, an insufficient or over ejection length may frequently occur. By adapting the steps in the present embodiment, the optical disk drive 200 can differentiate the size of the disk immediately, and provide the adequate ejecting force for the disk. Therefore, an adequate ejecting force for the disk loaded in the optical disk drive can be determined according to the embodiment of the invention.

In the optical disk drive, the optical pickup head is usually moved from the outer side of the disk to the inner side of the disk as a starting procedure. The method of detecting the optical disk according to the embodiment of the invention quickly tells the size of the optical disk loaded in the drive when this starting procedure is acted. Accordingly, the time for waiting the disk to be ejected can be reduced.

In the above disclosure, the optical pickup head ought to be moved from the initial position to the inner side of the track as a starting procedure. At the same time, the size of the optical disk can be determined by checking the conditions of the reflected light received by the pickup head. Compared with the conventional method, which differentiates the disks by the different angular velocities (caused by different inertia momentums or different weights of the disks with different sizes) in the rotation, the method disclosed in the preferred embodiment can differentiate the disk quickly without driving the spindle motor for rotating the disk. Also, even the disk is slightly scraped; the size of the disk can still be accurately differentiated according to the disclosure of the embodiment. Therefore, when the optical disk is loaded into the optical disk drive with the program disclosed according to the embodiment of the invention, and an ejected button is pressed immediately, the disk can be quickly ejected, along with a sufficient ejecting length and an adequate ejecting force.

Moreover, not only the users but also the operator for testing the optical disk drive benefit from the method disclosed according to the embodiment of the invention. When the method disclosed in the embodiment is applied in the optical disk drive manufacturing process for testing the loading/ejecting disk, it is no need to wait the decoding procedure being completely finished. Hence, the testing time in the manufacturing process can also be efficiently reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for detecting a size of an optical disk, the optical disk loaded in an optical disk drive having an optical pickup head, and an initial position of the optical pickup head located on an outer side of a track, the method comprising the steps of:
    loading the optical disk;
    moving the optical pickup head from the initial position to a first position and irradiating a laser beam simultaneously and continuously, and receiving the reflected laser beam from the optical disk; and
    determining a size of the optical disk according to the laser beam reflected by the optical disk received by the optical pickup head during the time when the optical pickup moves from the initial position to the first position.

2. The method according to claim 1, wherein the optical disk drive is a slot-in drive.

3. The method according to claim 1, wherein the optical disk drive is a tray type drive.

4. The method according to claim 1, wherein the first position is located at an inner side of the track.

5. The method according to claim 1, wherein a diameter of the optical disk is either 8 cm or 12 cm.

6. A method for ejecting an optical disk loaded in an optical disk drive, the optical disk drive having an optical pickup head, and an initial position of the optical pickup head located in an outer side of a track, the method comprising the steps of:
    loading the disk;
    moving the optical pickup head from the initial position to a first position and irradiating a laser beam simultaneously and continuously, and the laser beam reflected by the optical disk received by the optical pickup head;
    determining a size of the optical disk according to the laser beam reflected by the optical disk received by the optical pickup head during the time when the optical pickup moves from the initial position to the first position; and
    determining an ejection length according to the determined size of the disk when an ejection signal is received.

7. The method according to claim 6, wherein the optical disk drive is a slot-in drive.

8. The method according to claim 6, wherein the optical disk drive is a Way type drive.

9. The method according to claim 6, wherein the first position is in an inner side of the track.

10. The method according to claim 6, wherein the diameter of the optical disk is either 8 cm or 12 cm.

* * * * *

UNITED STATES PATENT AND TRADEMARK OFFICE
CERTIFICATE OF CORRECTION

PATENT NO. : 7,607,144 B2  Page 1 of 1
APPLICATION NO. : 11/359571
DATED : October 20, 2009
INVENTOR(S) : Chang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 654 days.

Signed and Sealed this

Twelfth Day of October, 2010

David J. Kappos
*Director of the United States Patent and Trademark Office*